US012572920B1

(12) United States Patent
Holland

(10) Patent No.: US 12,572,920 B1
(45) Date of Patent: Mar. 10, 2026

(54) RESOURCE TRANSFER TO SELECTABLE RECIPIENTS VIA SELECTABLE MODES OF TRANSFER

(71) Applicant: THE HUNTINGTON NATIONAL BANK, Columbus, OH (US)

(72) Inventor: Todd Holland, Columbus, OH (US)

(73) Assignee: THE HUNTINGTON NATIONAL BANK, Columbus, OH (US)

( * ) Notice: Subject to any disclaimer, the term of this patent is extended or adjusted under 35 U.S.C. 154(b) by 94 days.

(21) Appl. No.: 18/986,962

(22) Filed: Dec. 19, 2024

(51) Int. Cl.
*G06Q 20/32* (2012.01)

(52) U.S. Cl.
CPC ................................ *G06Q 20/3223* (2013.01)

(58) Field of Classification Search
CPC .................................................. G06Q 20/3223
See application file for complete search history.

(56) References Cited

U.S. PATENT DOCUMENTS

| | | | | |
|---|---|---|---|---|
| 10,410,207 | B1 * | 9/2019 | Butler | G06Q 20/356 |
| 10,977,651 | B2 * | 4/2021 | Van Os | G06Q 30/0631 |
| 11,756,007 | B2 * | 9/2023 | Ferguson | G06Q 20/42 |
| | | | | 705/42 |
| 11,756,020 | B1 * | 9/2023 | Stipech | G06F 3/0486 |
| | | | | 705/41 |
| 11,790,334 | B1 * | 10/2023 | Corcillo | G06Q 30/0611 |
| | | | | 705/69 |

| | | | | |
|---|---|---|---|---|
| 12,147,985 | B1 * | 11/2024 | Vengalathur Srinath | |
| | | | | G06Q 20/4016 |
| 2003/0220858 | A1 * | 11/2003 | Lam | G06Q 30/04 |
| | | | | 705/34 |
| 2012/0226933 | A1 * | 9/2012 | Baptist | G06F 11/0727 |
| | | | | 714/E11.043 |

(Continued)

FOREIGN PATENT DOCUMENTS

| | | | | |
|---|---|---|---|---|
| WO | WO-2023018903 A1 * | 2/2023 | .......... | G06Q 20/065 |
| WO | WO-2023121756 A1 * | 6/2023 | | |

OTHER PUBLICATIONS

Kristin Johnson, et al., "Artificial Intelligence, Machine Learning, and Bias in Finance: Toward Responsible Innovation", Fordham Law Review, Nov. 2019, 31 pages. Available at: https://fordhamlawreview.org/wp-content/uploads/2019/11/Johnson-Pasquale-Chapman_November_S_5.pdf (Year: 2019).*

(Continued)

*Primary Examiner* — Gregory Harper
(74) *Attorney, Agent, or Firm* — Kilpatrick Townsend & Stockton LLP

(57) ABSTRACT

A system for facilitating transfer of a resource to a sender-selected recipient according to a sender-selected mode of resource transfer is disclosed. A group of selectable additional recipients of the resource may also be presented to the sender and one or more of the selectable additional recipients may be selected by the sender to receive the resource along with an initially specified recipient. The group of selectable additional recipients of the resource to be presented to the sender, and different modes of resource transfer from which the sender can select, may be determined in various ways, including by an output of discrete trained machine-learning models. Once a selection of a recipient(s) and a mode of resource transfer is received, a resource transfer command message can be generated and sent to a resource transfer computing system to initiate a transfer of the resource to the recipient(s).

20 Claims, 9 Drawing Sheets

(56)        References Cited

U.S. PATENT DOCUMENTS

| | | | | |
|---|---|---|---|---|
| 2013/0290650 | A1* | 10/2013 | Chang | G06F 3/0653 |
| | | | | 711/E12.001 |
| 2014/0173229 | A1* | 6/2014 | Reohr | G06F 3/0611 |
| | | | | 711/162 |
| 2015/0294297 | A1* | 10/2015 | Lipshultz | G06Q 20/386 |
| | | | | 705/39 |
| 2016/0104133 | A1* | 4/2016 | Davis | G06Q 20/10 |
| | | | | 705/39 |
| 2016/0117651 | A1* | 4/2016 | Davis | G06Q 20/3255 |
| | | | | 705/40 |
| 2016/0117665 | A1* | 4/2016 | Davis | G06Q 20/223 |
| | | | | 705/39 |
| 2016/0117666 | A1* | 4/2016 | Davis | G06Q 20/384 |
| | | | | 705/39 |
| 2016/0117670 | A1* | 4/2016 | Davis | G06Q 20/3255 |
| | | | | 705/39 |
| 2017/0006126 | A1* | 1/2017 | Long, III | H04L 67/60 |
| 2018/0183737 | A1* | 6/2018 | Subbarayan | H04L 51/216 |
| 2018/0246983 | A1* | 8/2018 | Rathod | G06F 16/972 |
| 2020/0329000 | A1* | 10/2020 | Chitrapu | G06F 18/22 |
| 2020/0334724 | A1* | 10/2020 | Garrett | H04L 67/104 |
| 2020/0364094 | A1* | 11/2020 | Kahle | G06F 12/0842 |
| 2021/0081920 | A1* | 3/2021 | Spina | G06N 20/00 |
| 2021/0365806 | A1* | 11/2021 | Sumanth | G06N 20/00 |
| 2021/0390544 | A1* | 12/2021 | Terrell | G06Q 20/405 |
| 2022/0277291 | A1* | 9/2022 | Roongta | G06Q 20/385 |
| 2022/0383278 | A1* | 12/2022 | D'Agostino | G06Q 20/108 |
| 2023/0037807 | A1* | 2/2023 | Dunjic | H04L 67/06 |
| 2023/0067630 | A1* | 3/2023 | Dunjic | G06Q 20/382 |
| 2023/0074653 | A1* | 3/2023 | Mawson | G06Q 20/0855 |
| 2023/0185610 | A1* | 6/2023 | Bast | G06F 9/466 |
| | | | | 718/104 |
| 2023/0259397 | A1* | 8/2023 | Dolan | G06F 9/5061 |
| | | | | 718/104 |
| 2023/0259988 | A1* | 8/2023 | Friedman | G06Q 20/3223 |
| | | | | 705/39 |
| 2023/0262059 | A1* | 8/2023 | Dash | G06F 18/214 |
| | | | | 726/26 |
| 2023/0336512 | A1* | 10/2023 | Arora | G06F 16/90332 |
| 2024/0185209 | A1* | 6/2024 | Skipper | G06Q 30/0207 |
| 2024/0232653 | A1* | 7/2024 | Horstman | G06N 20/00 |
| 2024/0267376 | A1* | 8/2024 | Patangia | H04L 63/0869 |
| 2024/0338935 | A1* | 10/2024 | Pedone | G06T 5/00 |
| 2024/0362641 | A1* | 10/2024 | Leighton | G06Q 30/0279 |
| 2024/0378584 | A1* | 11/2024 | Akkaluri | G06Q 30/015 |
| 2024/0420133 | A1* | 12/2024 | Dappuri | G06N 5/022 |
| 2025/0131418 | A1* | 4/2025 | Salvador | G06Q 20/023 |

OTHER PUBLICATIONS

Rajat Tandon, et al., "I know what you did on Venmo: Discovering privacy leaks in mobile social payments", Proceedings on Privacy Enhancing Technologies, Mar. 2022, 22 pages. Available at: https://petsymposium.org/popets/2022/popets-2022-0069.pdf (Year: 2022).*

* cited by examiner

300

302 Input Data

304 Resource Type Information

306 Resource Value Information

308 Recipient Classification Information

300 Second Trained Machine-Learning Model

310 Output

312 Selectable Additional Recipients

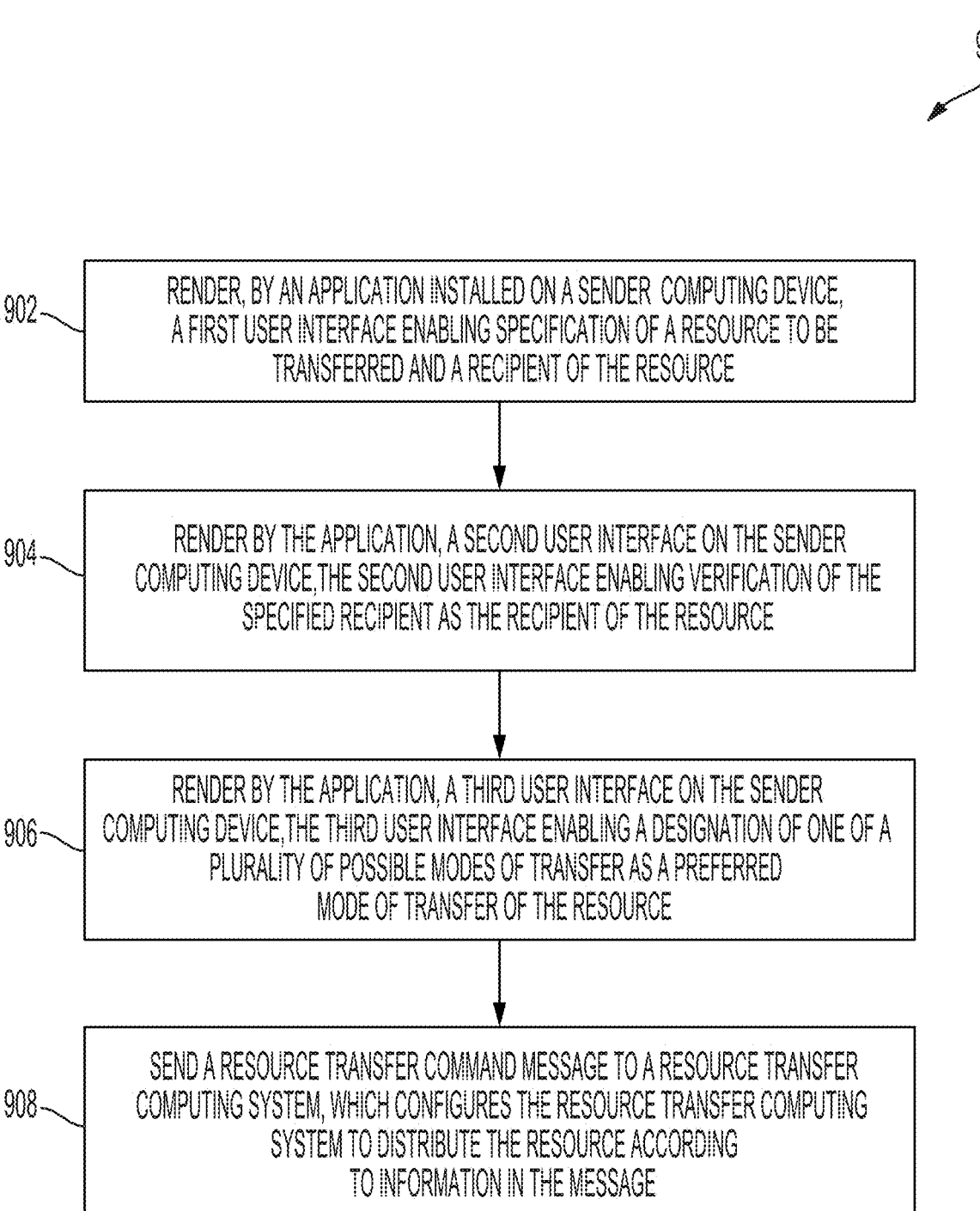

900

902 — RENDER, BY AN APPLICATION INSTALLED ON A SENDER COMPUTING DEVICE, A FIRST USER INTERFACE ENABLING SPECIFICATION OF A RESOURCE TO BE TRANSFERRED AND A RECIPIENT OF THE RESOURCE

904 — RENDER BY THE APPLICATION, A SECOND USER INTERFACE ON THE SENDER COMPUTING DEVICE, THE SECOND USER INTERFACE ENABLING VERIFICATION OF THE SPECIFIED RECIPIENT AS THE RECIPIENT OF THE RESOURCE

906 — RENDER BY THE APPLICATION, A THIRD USER INTERFACE ON THE SENDER COMPUTING DEVICE, THE THIRD USER INTERFACE ENABLING A DESIGNATION OF ONE OF A PLURALITY OF POSSIBLE MODES OF TRANSFER AS A PREFERRED MODE OF TRANSFER OF THE RESOURCE

908 — SEND A RESOURCE TRANSFER COMMAND MESSAGE TO A RESOURCE TRANSFER COMPUTING SYSTEM, WHICH CONFIGURES THE RESOURCE TRANSFER COMPUTING SYSTEM TO DISTRIBUTE THE RESOURCE ACCORDING TO INFORMATION IN THE MESSAGE

*FIG. 9*

RESOURCE TRANSFER TO SELECTABLE RECIPIENTS VIA SELECTABLE MODES OF TRANSFER

TECHNICAL FIELD

The present disclosure relates generally to user interaction with computing infrastructure, and more particularly, although not exclusively, to facilitating resource transfer to sender-specified recipients using sender-selected resource modes of transfer.

BACKGROUND

Resources may be transferred between parties for various reasons, such as for example, to procure items, or as an exchange of one resource for another. Resource transfers from a sender to a recipient may occur through an intermediary transferor. For example, senders who routinely transfer resources to a same or similar large group of recipients may establish a recurring transfer arrangement with a third party transferor such that, once established, the sender plays little to role in the transfer. Such arrangements typically require a complex setup and also commonly necessitate that the third party transferor obtain and store a sometimes substantial amount of recipient personal identifiable information (PII). Mechanisms for making resource transfers that are not regularly recurring or are not made in bulk are typically limited to those by which a sender can transfer a resource to only one recipient at a time, are frequently incapable of receiving resource transfer instructions from recipients, and may have significant resource transfer restrictions, which can render such mechanisms unattractive to business senders. Such resource transfer characteristics can also reduce process efficiency and can consume significant computing and human resources—especially given that some senders may perform a large number of ad hoc resource transfers—and may further cause unwanted tracking, reporting, or other issues for senders and/or recipients of the resources.

SUMMARY

According to one example, a system may include a processor and a memory communicatively coupled to the processor. The memory can include instructions that are executable by the processor to cause the processor to perform operations. The operations may include rendering, by an application installed on a sender computing device, a first user interface enabling specification of a resource to be transferred and a recipient of the resource. The operations may also include, subsequent to receiving the specification of the resource to be transferred and the recipient of the resource at the first user interface, rendering, by the application, a second user interface on the sender computing device, the second user interface enabling verification of the specified recipient as the recipient of the resource. The operations may also include, subsequent to receiving a verification of the specified recipient as the recipient of the resource at the second user interface, rendering, by the application, a third user interface on the sender computing device, the third user interface presenting a plurality of modes of transfer of the resource and enabling a designation of one of the plurality of modes of transfer as a preferred mode of transfer of the resource. The operations may further include, subsequent to receiving the designation of the preferred mode of transfer of the resource at the third user interface, transmitting a resource transfer command message to a resource transfer computing system, the resource transfer command message including information identifying at least the resource, the recipient of the resource, and the preferred mode of transfer of the resource. According to the operations, upon receiving the resource transfer command message, the resource transfer computing system is configured to transfer the resource to the recipient according to the information in the resource transfer command message.

According to another example, a computer-implemented method may include rendering by an application installed on a sender computing device, a first user interface enabling specification of a resource to be transferred and a recipient of the resource. The computer-implemented method may also include, subsequent to receiving the specification of the resource to be transferred and the recipient of the resource at the first user interface, rendering, by the application, a second user interface on the sender computing device, the second user interface enabling verification of the specified recipient as the recipient of the resource. The computer-implemented method may additionally include, subsequent to receiving a verification of the specified recipient as the recipient of the resource at the second user interface, rendering, by the application, a third user interface on the sender computing device, the third user interface presenting a plurality of modes of transfer of the resource and enabling a designation of one of the plurality of modes of transfer as a preferred mode of transfer of the resource. The computer-implemented method may further include, subsequent to receiving the designation of the preferred mode of transfer of the resource at the third user interface, transmitting a resource transfer command message to a resource transfer computing system, the resource transfer command message including information identifying at least the resource, the recipient of the resource, and the preferred mode of transfer of the resource. According to the computer-implemented method, receiving the resource transfer command message configures the resource transfer computing system to transfer the resource to the recipient according to the information in the resource transfer command message.

According to a further example, a non-transitory computer readable medium may include instructions that are executable by a processor for causing the processor to perform operations. The operations may include rendering, by an application installed on a sender computing device, a first user interface enabling specification of a resource to be transferred and a recipient of the resource. The operations may also include, subsequent to receiving the specification of the resource to be transferred and the recipient of the resource at the first user interface, rendering, by the application, a second user interface on the sender computing device, the second user interface enabling verification of the specified recipient as the recipient of the resource. The operations may additionally include, subsequent to receiving a verification of the specified recipient as the recipient of the resource at the second user interface, rendering, by the application, a third user interface on the sender computing device, the third user interface presenting a plurality of modes of transfer of the resource and enabling a designation of one of the plurality of modes of transfer as a preferred mode of transfer of the resource. The operations may further include, subsequent to receiving the designation of the preferred mode of transfer of the resource at the third user interface, transmitting a resource transfer command message to a resource transfer computing system, the resource transfer command message including information identifying at least the resource, the recipient of the resource, and the preferred mode of transfer of the resource. According to the operations, upon receiving the resource transfer command message, the resource transfer computing system is configured to transfer the resource to the recipient according to the information in the resource transfer command message.

BRIEF DESCRIPTION OF THE DRAWINGS

FIG. 9 is a flowchart of a computer-implemented method for facilitating ad hoc transfer of resources to one or more sender-identified recipients using sender-selected modes of resource transfer, according to one example.

DETAILED DESCRIPTION

Figure 1:
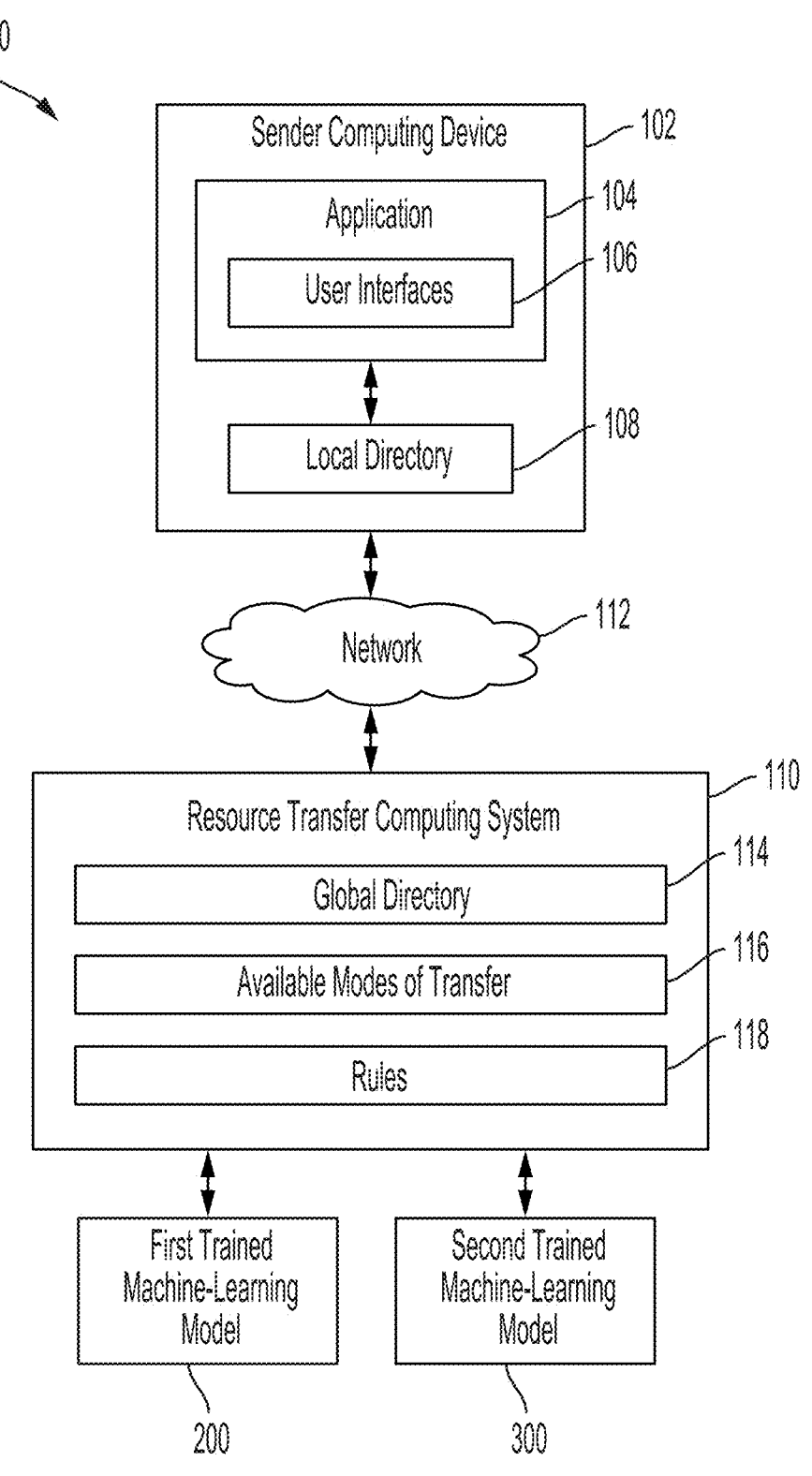
FIG. 1 is a block diagram illustrating a system for facilitating ad hoc resource transfer, according to one example.
Figure 2:
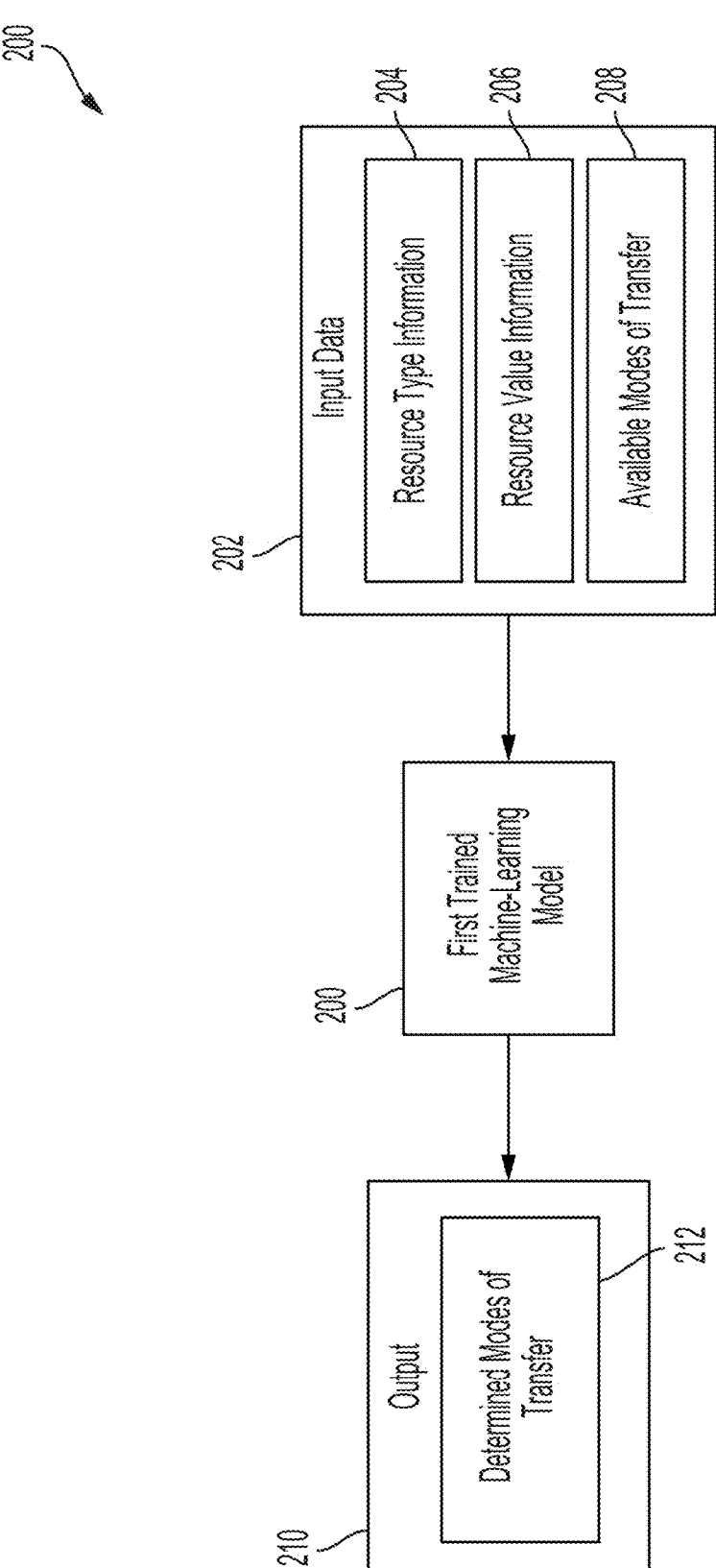
FIG. 2 is a block diagram illustrating a first trained machine learning model that may be a part of or may be accessible by the system of FIG. 1.
Figure 3:
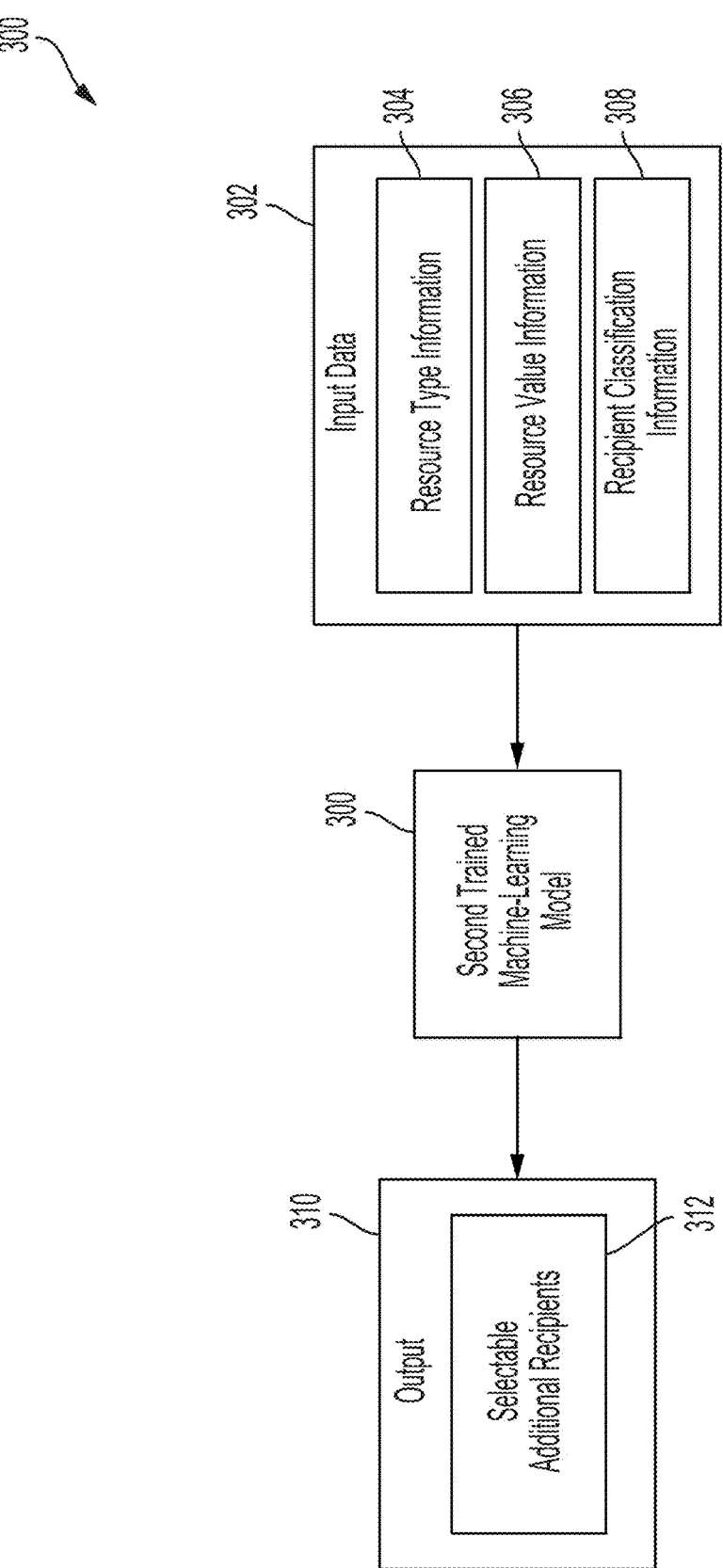
FIG. 3 is a block diagram illustrating a second trained machine learning model that may be a part of or may be accessible by the system of FIG. 1.

Certain aspects and features of the present disclosure relate to a system for facilitating transfer of a resource to a sender-selected recipient according to a sender-selected mode of resource transfer. The system may include a sender computing device such as a personal computer, a laptop computer, a tablet, a smart phone, etc. The sender computing device may have a resource transfer application ("application") installed thereon. The application may include instructions that are executable by the processor to cause the processor to perform operations, including resource transfer operations that involve rendering various user for interfaces that may be interacted with by the sender of a resource.

The application may present a number of different user interfaces on the sender computing device. For example, a first user interface may allow a sender to specify the resource to be transferred and an intended recipient of the resource. A second user interface may, for example, present the recipient specified at the first user interface, such as for allowing the sender to verify the recipient selection or to cancel the recipient selection. The selected recipient may be presented on the second user interface with information sufficient to verify the recipient's identity. In some examples, the second user interface may further present a group of selectable additional recipients to whom the sender may also be interested in transferring the resource. In some examples the group of selectable additional recipients may be determined by a trained machine learning model. In some examples, the sender can select one or more of the selectable additional recipients to each receive the transfer specified on the first user interface along with (or instead of) the initially specified recipient. In some examples, the initially specified recipient and the plurality of selectable additional recipients may be stored in a searchable local directory containing recipient identifying information.

Subsequent to receiving a selection of one or more recipients of the resource at the second user interface, the application may render a third user interface on the sender computing device. The third user interface may present a plurality of modes of transfer of the resource and can enable a designation by the sender of one of the plurality of modes of transfer as a preferred mode of transfer of the resource. The plurality of modes of transfer presented on the third user interface may be based on rules. In some examples, the plurality of modes of transfer presented on the third user interface may be determined by a trained machine learning model.

Subsequent to the application receiving a specified resource for transfer, a selected one or more recipients to receive the resource, and a selected a mode of resource transfer, the application can send a resource transfer command message to a resource transfer computing system. The resource transfer command message may be generated by the application. The resource transfer command message can include information identifying at least the resource, the one or more recipients of the resource, and the preferred mode of transfer of the resource. Receipt of the resource transfer command message can configure the resource transfer computing system to transfer the resource to each of the one or more recipients according to the information in the resource transfer command message. When a resource is transferred by the resource transfer computing system, the resource transfer computing system may send a notification of the transfer to the recipient. In some examples, the notification may be a device-specific push notification.

Use of a system according to the disclosure can conserve both computing and human resources. For example, providing a sender with a directory or other listing of recipients to which a resource can be transferred obviates the need to perform a recipient search within a much larger and potentially nonrelevant group of selectable recipients. Allowing a sender to select both a recipient and a mode of resource transfer using an application on a sender computing device, and to provide both pieces of information to a resource transfer computing system, also eliminates the need for the resource transfer computing system to contact a recipient to request a preferred mode of transfer prior to transferring a resource. Systems according to the disclosure can also be implemented and operated using minimal recipient personal information. For example, in addition to a recipient name, only a recipient phone number or email address may additionally be required in order to transfer the resource to the recipient.

These illustrative examples are provided to introduce the reader to the general subject matter discussed herein, and are not intended to limit the scope of the disclosed concepts. In the following description, various additional features and examples are described with reference to the drawings in which like numerals indicate like elements. Various implementations may be practiced without these specific details, and features can be combined together. The figures and description are not intended to be restrictive.

FIG. 1 is a block diagram illustrating one example of a system 100 for facilitating transfer of sender-specified resources to one or more sender-selected recipients via sender-selected modes of resource transfer. The system 100 is shown, in this example, to include a sender computing device 102. The sender computing device 102 can be, for example, a personal computer, a laptop computer, a tablet, a smart phone, etc. Thus, the sender computing device 102 may include a processor and a memory. A resource transfer application ("application") 104 may be installed on the sender computing device 102, such as in the memory. The application 104 may include instructions that are executable by the processor to cause the processor to perform operations, including resource transfer operations.

When executed, the application 104 may present a number of different user interfaces 106 on the sender computing device 102. For example, a first user interface may allow a sender to specify the resource to be transferred. The location of the resource may also be specified in some examples. When the resource to be transferred is a portion of an overall larger resource, the first user interface may also indicate what portion of the overall larger resource is still available for transfer. In some examples, the first user interface may include a portal to a second user interface. For example, the first user interface may accept (e.g., via a search box) identifying information for a recipient of the resource. Once the sender has specified an intended recipient of the resource, the application may advance or be advanced by the sender to a second user interface.

A second user interface may, for example, present the recipient specified at the first user interface, such as for allowing the sender to confirm the recipient selection or to cancel the recipient selection (e.g., if the sender made a mistake or the system presents the wrong "John Doe." The selected recipient may be presented on the second user interface with information sufficient to verify the recipient's identity. For example, an email address or telephone number may be presented along with the name of the recipient to avoid selection and resource transfer to an unintended recipient.

In some examples, the second user interface may further suggest a plurality of selectable additional recipients to whom the sender may also be interested in transferring the resource. The plurality of selectable additional recipients presented to the sender may be selected, for example, based on past resource transfer activities of the sender, a relationship between the sender and the selectable additional recipients, a relationship between the selectable additional recipients, a category or classification of the selectable additional recipients, or otherwise. As described in more detail below, in some examples the plurality of selectable additional recipients may be determined by a trained machine learning model. In any case, the sender can select one or more of the additional additional recipients to each receive the transfer specified on the first user interface. In some examples, the initially specified recipient and the plurality of selectable additional recipients may be stored in a searchable local directory 108 containing identifying information for the recipients. The local directory 108 may, at least in some examples, store only minimal recipient personal information (e.g., name, email, phone number). When the sender selects more than one recipient for transfer of the resource, a listing of the selected recipients may be displayed on the second user interface.

After receiving a selection of one or more recipients of the resource at the second user interface, the application 104 may render a third user interface on the sender computing device 102. The third user interface may, for example, present a plurality of modes of transfer of the resource and can enable a designation by the sender of one of the plurality of modes of transfer as a preferred mode of transfer of the resource for the selected recipient(s). As described in more detail below, the plurality of modes of transfer presented on the third user interface may be based on rules and may also be determined by a trained machine learning model.

As indicated, the sender computing device 102 may communicate with a resource transfer computing system 110 over a network 112. The network 112 may be a local area network (LAN), a wide-area network (WAN) such as the Internet, an institutional network, cellular or other wireless networks, and so on.

In some examples, the resource transfer computing system 110 may be operated by the owner of the resource transfer computing system 110, or on behalf of the owner of the resource transfer computing system 110. The resource transfer computing system 110 can include various processing and other hardware and software or application components. For example, the resource transfer computing system 110 may be a server, or a distributed computing system having multiple servers, virtual machines, etc. In other examples, the resource transfer computing system 110 may be a computing system of an entity such as a cloud service provider that facilitates transfer of computing resources such as processing and storage resources to users or a financial institution that facilitates transfer of resources such a monetary payments to recipients. In some examples, the resource transfer computing system 110 may be communicatively coupled to one or more remote servers or other remote computing systems, and may utilize the one or more remote servers or other remote computing systems to transfer resources to recipients at least with respect to certain modes of transfer (e.g., a stored value card mode of transfer).

The resource transfer computing system 110 may include a global directory 114 of selectable resource recipients. The global directory 114 may be populated in a number of ways. For example, at least a portion of the recipients in the global directory 114 may be customers of the owner or operator of the resource transfer computing system 110. The resource transfer computing system 110 can cross-check recipients identified by senders via the application 104 with the global directory 114 at least with respect to determining what modes of resource transfer can be used to transfer a resource to a given recipient. For example, when the owner of the resource transfer computing system 110 is a financial institution, the cross-check operation may determine that the recipient identified by the sender has an account with the financial institution to which a monetary resource can be transferred.

The local directory 108 associated with the application 104 on the sender computing device 102 may be populated in part by the global directory, and vice versa. For example, when a sender enters recipient information into the application 104 on the sender computing device 102 that is not present in the global directory 114, the recipient information may be added to the global directory 114 by the resource transfer computing system 110. Likewise, the global directory 114 may periodically push, or the application 104 on the sender computing device 102 may periodically request, recipient information updates from the global directory 114. For example, the global directory 114 may populate the local directory 108 with information for recipients who are determined to have an association with a sender. In some examples, the application 104 on the sender computing device 102 may allow a user to block or otherwise opt out of such information transfers with the global directory 114 of the resource transfer computing system 110. As with the local directory 108 associated with the application 104, the global directory may, at least in some examples, store only minimal recipient personal information (e.g., name, email, phone number).

The resource transfer computing system 110 may include available modes of transfer information 116. Particularly, the resource transfer computing system 110 is aware of the various modes by which it is able to transfer resources to recipients.

The resource transfer computing system 110 may further include rules 118 for determining what modes of transfer of all the available modes of transfer will be made available for a particular resource type or for a particular resource value. For example, certain modes of transfer may not be usable to transfer resources having a value that exceeds some predetermined limit, which may be different across different modes of transfer. The resource transfer computing system 110 can also use the rules 118 in conjunction with recipient information received from the application 104 of the sender computing device 102 or retrieved from the global directory 114, to determine what modes of transfer may be presented to a sender for a given recipient and a given resource.

Once a sender has specified a resource for transfer, selected one or more recipients to receive the resource, and selected a mode of resource transfer, the application 104 can send a resource transfer command message to the resource transfer computing system 110. The resource transfer command message may be generated by the application 104. The resource transfer command message can include as a payload, information identifying at least the resource, the one or more recipients of the resource, and the preferred mode of transfer of the resource.

Upon receiving the resource transfer command message, the resource transfer computing system 110 may be configured to transfer the resource to each of the one or more recipients according to the information in the resource transfer command message. In some examples, the resource transfer computing system 110 may directly transfer the resource to the recipient(s). For example, when the resource transfer computing system 110 is owned by or operated on behalf of a financial institution, the resource transfer computing system 110 may transfer monetary resources to directly to recipients via checks, account deposits, etc. Alternatively, the resource transfer computing system 110 may indirectly transfer the resource to the recipient(s), such as by engaging third party resource transfer systems.

When a resource is transferred by the resource transfer computing system 110, the resource transfer computing system 110 may send a notification of the transfer to the recipient. In some examples, the notification may be a device-specific push notification, such as a push notification to a mobile computing device such as a smart phone (e.g., as APNS for an iOS operating system or FCM for an Android operating system). In some embodiments, in-app notifications may be sent and may appear as popups on a user interface of the sender computing device 102. In some embodiments, notification messages may be displayed as overlays.

As shown in FIG. 1, the resource transfer computing system 110 may include or may be associated with one or more trained machine-learning models. In this particular example, the resource transfer computing system 110 includes or is associated with two trained machine-learning models 200, 300. For example, a first machine-learning model 200 may be used to determine what modes of transfer will be preferred by a sender for transfer of a resource. The second trained machine-learning model 300 may be used to determine a group of selectable additional recipients to present on the second user interface.

The first trained machine-learning model 200 can be provided with input data 202. In this example, the input data 202 may include resource type information 204 and resource value information 206 associated with a resource to be transferred to a recipient. The input data 202 may also include an identification of all the modes of transfer 208 that can be provided by the resource transfer computing system 110. The first trained machine-learning model 200 can be trained to generate an output 210 based on input of some or all of the input data 202 to the first trained machine-learning model 200. In some examples, only the resource type information 204 and the available modes of transfer 208 may be input to the first trained machine-learning model 200. In some examples, only the resource value information 206 and the available modes of transfer 208 may be input to the first trained machine-learning model 200. In other examples, different combinations of the resource type information 204, the resource value information 206, and the available modes of transfer 208, may be input to the first trained machine-learning model 200.

The output 210 of the first trained machine-learning model 200 may be a determination 212 of one or more of the available modes of transfer of the resource transfer computing system 110 that will be preferred by the sender for transfer of a resource. In some examples, the determination 212 may be based only on the type of the resource and the available modes of transfer of the resource transfer computing system 110. In some examples, the determination 212 may be based only on the value of the resource and the available modes of transfer of the resource transfer computing system 110. In other examples, the determination 212 may be based on a combination of one or both of the type of the resource and the value of the resource, in conjunction with the available modes of transfer. Various restrictions may be placed on the output 210 of the first trained machine-learning model 200. For example, the output 210 of the first trained machine-learning model 200 may be restricted to limit the determined modes of transfer preferred by the user to some predetermined number of the available modes of transfer.

In some examples, the first trained machine-learning model 200 may rank or otherwise assign weight to the determined modes of transfer that will be preferred by the user. The ranking or weighting may be used by the resource transfer computing system 110 to determine which of the determined modes of transfer should be presented to a sender in cases where all of the determined modes of transfer are not presented to the sender.

The second trained machine-learning model 300 may be used to determine a group of selectable additional recipients to present to a given sender on the second user interface rendered by the application 104 installed on the sender computing device 102. Use of the second trained machine-learning model 300 may be unique to a particular sender. Thus, the resource transfer computing system 110 may include or may be associated with a plurality of trained machine-learning models trained to determine groups of selectable recipients to present to a plurality of senders registered with or otherwise authorized to use the resource transfer computing system 110. In such a case, each trained machine-learning model may be associated with a unique sender of the plurality of senders.

The second trained machine-learning model 300 can be provided with input data 302. In this example, the input data 302 may include resource type information 304 and resource value information 306 associated with a resource to be transferred to a recipient. The input data 302 may also include recipient classification information 308. In some examples, the recipient classification information 308 may be or may include a recipient category. For example, a given recipient may be categorized as a business recipient or as an individual recipient. When a recipient is categorized as a business recipient, further subcategories may be associated with the recipient. For example, the business recipient may be more specifically classified by associating a business type with the business recipient (e.g., a landscaping service). When a given recipient is categorized as an individual recipient, further subcategories may be associated with the recipient. For example, the individual recipient may be more specifically classified by linking the individual with different organizations or institutions, or by other associations of the individual recipient. For example, a given recipient may be classified as an individual recipient associated with a particular university.

The recipient classification information 308 can be used alone, or in cooperation with the resource type information 304 and/or the resource value information 306 to determine a group of selectable additional recipients to present to the sender. For example, if a given sender typically instructs transfer of a resource to other business category recipients who provide exterior property maintenance services when the sender requests transfer of a resource to a business category recipient who provides landscaping services, the output 310 of the second trained machine-learning model 300 may result in a determination of a group of selectable additional business category recipients 312 from the local directory 108 that match that profile. The determined group of selectable additional business category recipients may then be presented on the second user interface. The determination may be additionally based on the type of the resource and/or the value of the resource to be transferred. In another example, if a given sender typically requests transfer of a resource to other individual category recipients who are affiliated with a given institution when the sender requests transfer of a resource to a recipient who is affiliated with the same institution, the output 310 of the second trained machine-learning model 300 may be a determination of a group of selectable individual category recipients 312 from the local directory 108 that match that profile. The determined group of selectable additional individual category recipients may then be presented on the second user interface. The determination may be additionally based on the type of the resource and/or the value of the resource to be transferred. For example, a bank deposit resource type in excess of some monetary value may further limit the recipients included in a group of selectable recipients.

As referenced above, the second trained machine-learning model 300 can be trained to generate an output 310 based on input of some or all of the input data 302 to the second trained machine-learning model 300. In some examples, only the resource type information 304 and the recipient classification information 308 may be input to the second trained machine-learning model 300. In some examples, only the resource value information 306 and the recipient classification information 308 may be input to the second trained machine-learning model 300. In other examples, all of the resource type information 304, the resource value information 306, and the recipient classification information 308, may be input to the second trained machine-learning model 300. In still other examples, only the recipient classification information 308 may be input to the second trained machine-learning model 300. Various restrictions may be placed on the output 310 of the second trained machine-learning model 300. For example, the output 310 of the second trained machine-learning model 300 may be restricted to limit the number of selectable additional recipients to some predetermined number of recipients and/or to further limit the selectable additional recipients to only those recipients additionally having a particular relationship to the sender or to an already selected recipient or category of recipients.

In some examples, the second trained machine-learning model 300 may rank or otherwise assign weight to the selectable additional recipients. The ranking or weighting may be used by the resource transfer computing system 110 to determine which of the selectable additional recipients should be presented to a sender in cases where not all selectable additional recipients of a determined group of possible selectable additional recipients are presented to the sender.

Model-training applications can be implemented to train machine-learning models to generate the first trained machine-learning model 200 and the second trained machine-learning model 300. The model-training applications may be a part of the resource transfer computing system 110, or the model-training applications may be separate and remote from the resource transfer computing system 110. Training the machine-learning models can transform the machine-learning models from an untrained state to a trained state (i.e., to the first and second trained machine-learning models 200, 300).

Various techniques may be utilized to train the machine-learning models. For example, training data may be provided to the machine-learning models in an iterative manner to enable the machine-learning models to identify trends or relationships in the training data. The machine-learning model training may be supervised training, unsupervised training, or a semi-supervised training. Parameter or hyper-parameter adjustment may also be utilized to minimize a loss function of the machine-learning models.

Training the machine-learning models can include accessing the training data, which may be stored, for example, at the resource transfer computing system 110 or at a database or another storage location that is remote from but accessible by the resource transfer computing system 110.

The training data associated with a first machine-learning model that is trained to generate the first trained machine-learning model 200 may include historical designation data associated with a plurality of historical resource mode of transfer designations executed by past senders. The historical designation data may include, among other information, an identification of the type of each resource represented in the historical designation data. The training data can also include value data that relates a value with each of the resources represented in the historical designation data. The values provided in the value data may be monetary values or values of another nature, depending on the resource type.

In some examples, each of the historical designation data and the value data may be individually used to train the first machine-learning model to generate the first trained machine-learning model 200 that can determine one or more resource modes of transfer preferred by a given sender. In such a case, the resulting first trained machine-learning model 200 may be trained to determine one or more resource modes of transfer preferred by a given sender based only on the information associated with the selected training data.

For example, if only the value data is used to train the first machine-learning model, the resulting first trained machine-learning model 200 may determine one or more resource modes of transfer preferred by a given sender based only on the value of a resource to be transferred to a recipient.

In other examples, different combinations of the historical designation data and the value data may be used to train the first machine-learning model. This may enable the resulting first trained machine-learning model 200 to more accurately determine one or more resource modes of transfer preferred by a given sender, as it is possible that sender mode of transfer preferences may frequently be based on more than one factor. To this end, in some examples, all of the historical designation data and the value data may be used in combination to train the first machine-learning model. In some examples, one or more of the historical designation data the value data may be weighted prior to being provided to the first machine-learning model for training. For example, if it is understood that user mode of transfer designations are most heavily influenced by the value of the resource, then the value data may be assigned more weight than the historical designation data during training of the first machine-learning model.

The training data associated with a second machine-learning model that is trained to generate the second trained machine-learning model 300 may include historical designation data associated with a plurality of historical resource mode of transfer designations executed by a given sender in association with resource transfer tasks instructions sent to the resource transfer computing system 110. The historical designation data may include, among other information, an identification of the type of each resource represented in the historical designation data. The training data can also include value data that relates a value with each of the resources represented in the historical designation data. The values provided in the value data may be monetary values or values of another nature, depending on the resource type. The training data can further include recipient classification information. The recipient classification information may be obtained, for example, from recipient classification information stored in the local directory 108 of a sender and/or from the global directory 114 of the resource transfer computing system 110.

In some examples, the recipient classification information may be used alone to train the second machine-learning model to generate the second trained machine-learning model 300 that can determine a group of selectable additional recipients for presentation to a sender. In such a case, the resulting second trained machine-learning model 300 may be trained to determine a group of selectable additional recipients based only on recipient information stored in the local directory 108 or in the global directory 114. In other examples, different combinations of the recipient classification information, historical designation data and the value data may be used to train the second machine-learning model. This may enable the resulting second trained machine-learning model 300 to more accurately determine a group of selectable additional recipients for presentation to a sender, as it is possible that sender recipient designations may be based on more than one factor. To this end, in some examples, the recipient classification information may be used in combination with the historical designation data and the value data to train the second machine-learning model. In another example, the recipient classification information may be used in combination with only the historical designation data to train the second machine-learning model. In another example, the recipient classification information may be used in combination with only the value data to train the second machine-learning model. In some examples, one or both of the historical designation data the value data may be weighted prior to being provided along with the recipient classification information to the second machine-learning model for training. For example, if it is understood that recipient selections are most heavily influenced by the value of the resource, then the value data may be assigned more weight than the historical designation data during training of the second machine-learning model.

It is also possible in some examples to include past sender and/or recipient demographic data in the training data, and to further use the past sender and/or recipient demographic data to train at least the first machine learning model. For example, the training data may further include demographic data for the past senders and/or recipients represented in the historical designation data. The demographic data may include, for example, one or more of age, gender, and location (e.g., residence information) of a sender or recipient. The demographic data may also include recipient financial information including but not limited to recipient income and user bank account information. Other sender or recipient information that may be usable to identify trends in sender mode of transfer preferences may also be included in the demographic data. When provided, the demographic data may be used with different combinations of the historical designation data and the value data to train the first machine learning model. Training the first machine-learning model in this manner can generate a trained machine-learning model that can output a determination 212 of the sender preferred modes of transfer, whether exclusively or in conjunction with different combinations of resource type information, and resource value information. While using demographic information may further enhance the ability of the first trained machine-learning model 200 to accurately determine what resource modes of transfer will be preferred by a given user, utilizing the demographic information may be disfavored in at least some examples at it requires the collection and use of additional personal identifying information (PII) beyond what is otherwise required to execute a resource transfer instruction (e.g., recipient name and email address or telephone number. Consequently, the use of demographic information as described above is entirely optional.

Various fitting, estimation, or other model-training optimization techniques can be used to ensure that, upon evaluation, the predictive output of the first machine-learning model 200 and the second trained machine-learning model 300 is accurate given the input data (i.e., to minimize the loss function). One or both of the resulting first and second trained machine-learning models 200, 300 can then be deployed for application to newly received input data, as described above.

Figure 4:
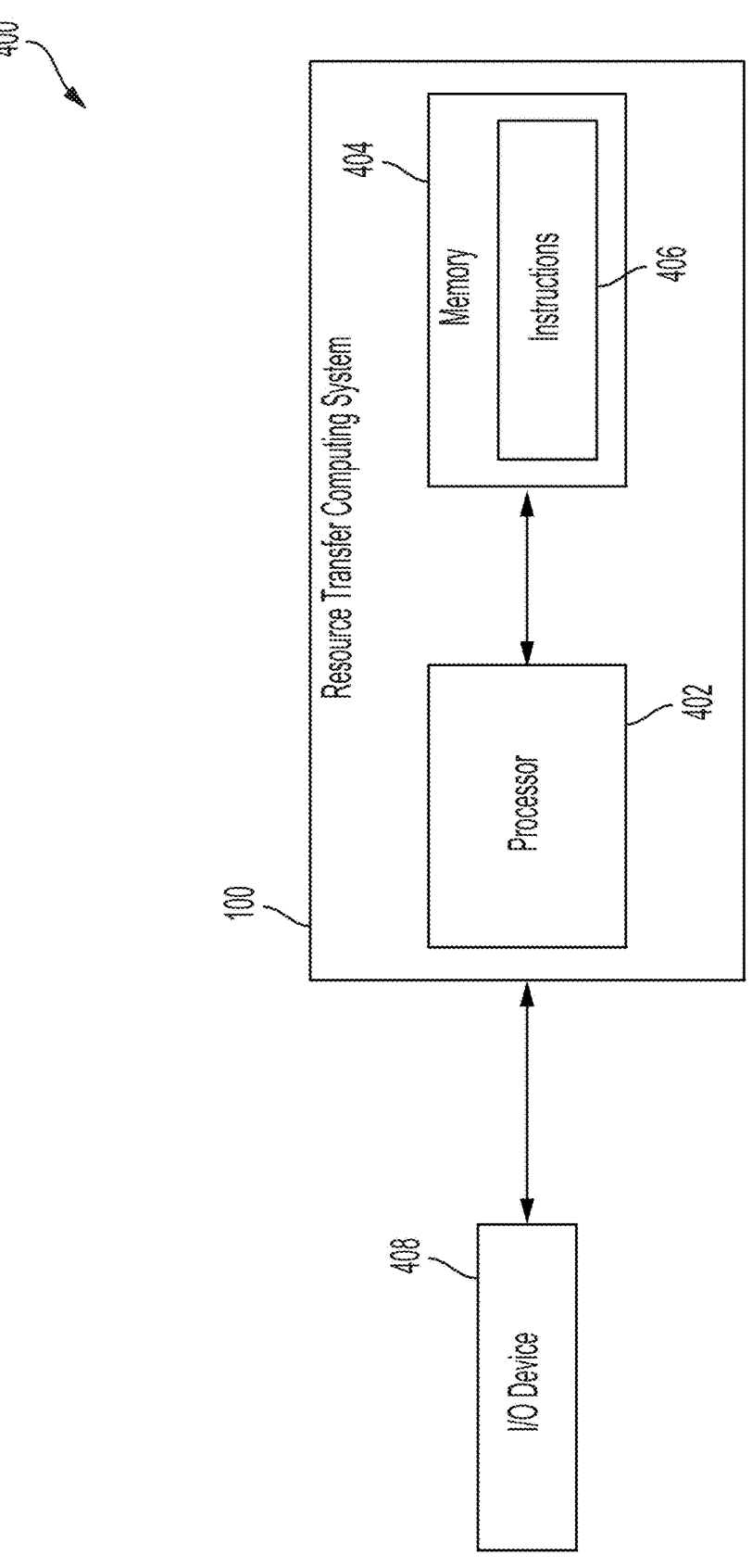
FIG. 4 is a block diagram illustrating various computing components of the system of FIG. 1, according to one example.

FIG. 4 is a block diagram illustrating various components of a resource transfer computing system, such as the resource transfer computing system 110 of FIG. 1, that is usable for ad hoc transfer of resources sender-selected recipients via sender-selected modes of transfer. As illustrated, the resource transfer computing system 110 may include a processor 402. The processor 402 can include one processing device or multiple processing devices. Non-limiting examples of the processor 402 include a Field-Programmable Gate Array (FPGA), an application-specific integrated circuit (ASIC), a microprocessor, etc. A memory 404 may be communicatively coupled to the processor 402. The memory 404 can include instructions that are executable by the processor 402 to cause the processor 402 to perform operations. In some examples, the instructions 406 can include processor-specific instructions generated by a compiler or an interpreter from code written in a suitable computer-programming language, such as C, C++, C#, etc.

The memory 404 can include one memory or multiple memories. The memory 404 can be non-volatile and may include any type of memory that retains stored information when powered off. Non-limiting examples of the memory 404 include electrically erasable and programmable read-only memory (EEPROM), flash memory, or any other type of non-volatile memory. At least some of the memory 404 can be a non-transitory computer-readable medium from which the processor 402 can read the instructions 406. A computer-readable medium can include electronic, optical, magnetic, or other storage devices capable of providing the processor 402 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 402 can read the instructions 406. In some examples, the memory 404 may include the first trained machine-learning model 200 and/or the second trained machine-learning model 300.

Figure 5:
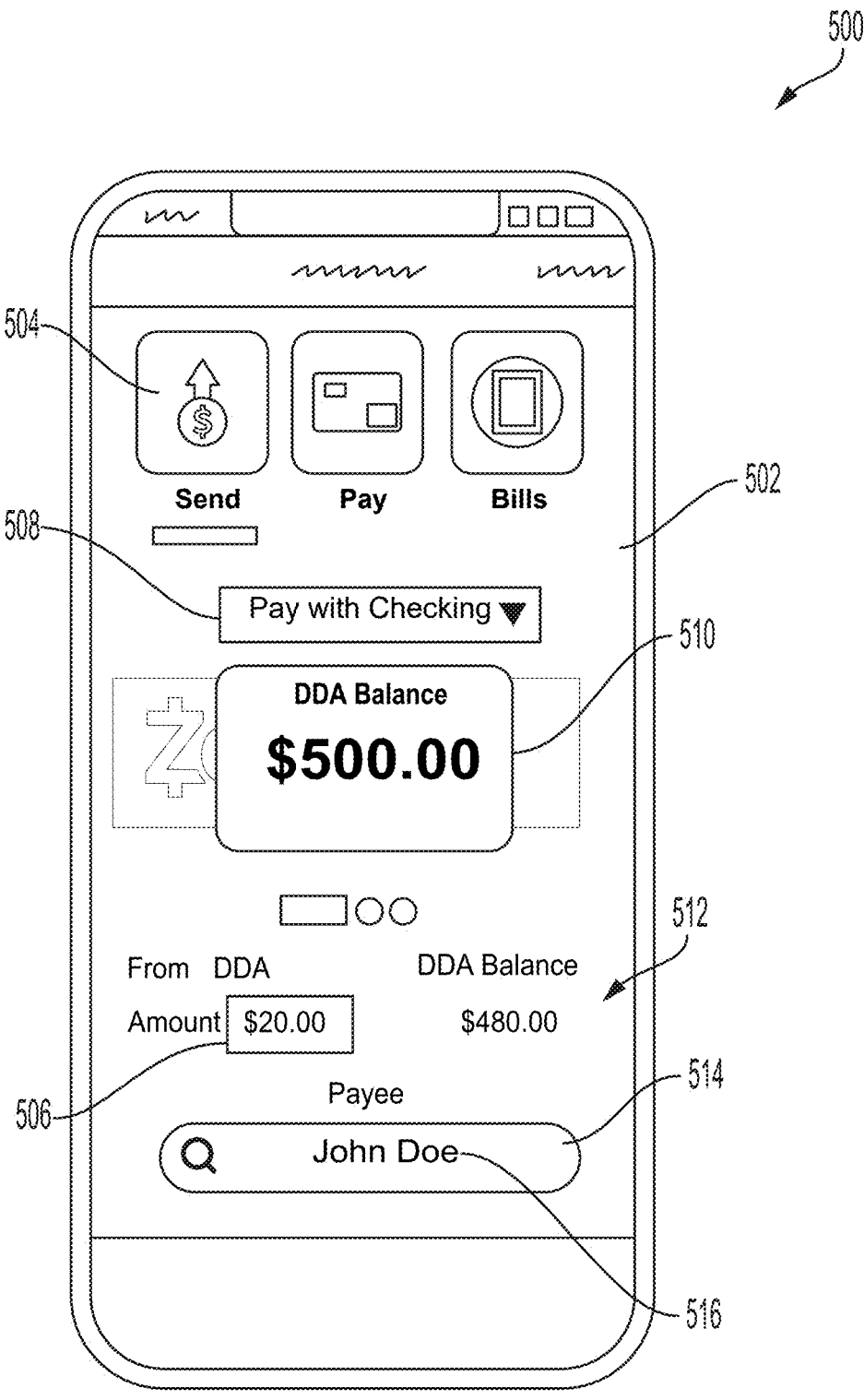
FIG. 5 is a schematic representation of a customizable first user interface of a sender computing device via which a sender can specify a resource to be transferred, according to one example.

FIG. 5 is a schematic representation of one example of a sender computing device 500 on which is installed a resource transfer application. The sender computing device 500 is communicatively coupled to a resource transfer computing system, such as the resource transfer computing system 110 of FIG. 1. In the example of FIG. 5, the sender computing device 500 is shown to be a smart phone on which is displayed a first resource transfer user interface ("first user interface") 502. The first user interface 502 may be displayed in response to various actions, such as upon a sender logging in to the resource transfer computing system 110 and the resource transfer computing system 110 subsequently authorizing communications with the sender computing device 500.

As shown, the first user interface 502 may display an interface object such as, for example, a selectable button 504, by which a sender can initiate a resource transfer process with the resource transfer computing system 110. The first user interface 502 may also display a resource widget 506 (e.g., a typing box or a pull down menu) by which the sender can specify a resource to be transferred. In this example, the resource is specified to be a monetary resource having a value of $20.00. In some examples, such as examples where the resource is a monetary resource, the first user interface 502 may also include a resource location widget 508 by which the sender can specify a location of the resource to be transferred. In this example, the sender has indicated that the $20.00 monetary resource is to be obtained from a checking account of the sender. As shown, an initial balance 510 of the checking account prior to the resource transfer may also be displayed. When the resource to be transferred is a portion of an overall larger resource, such as a portion of the initial account balance 510, the first user interface 502 may also indicate the portion of the overall larger resource that is still available for transfer 512 (e.g., $480.00 in this example).

A shown, the first user interface 502 may also include a portal to a second user interface. For example, the first user interface 502 may include a recipient identification widget 514 (e.g., a search box) where identifying information for a recipient 516 of the resource may be initially provided. In this example, the sender has specified the intended recipient 516 of the resource as "John Doe" by entering the same into the recipient identification widget 514, such as via typing or a voice utterance. In this example, after the application receives a specification of the intended recipient 516 of the resource via the recipient identification widget 514, the application may advance to a second user interface. The application may be caused to advance from the first user interface to the second user interface by other mechanisms (e.g., a "next" button) in other examples.

Figure 6:
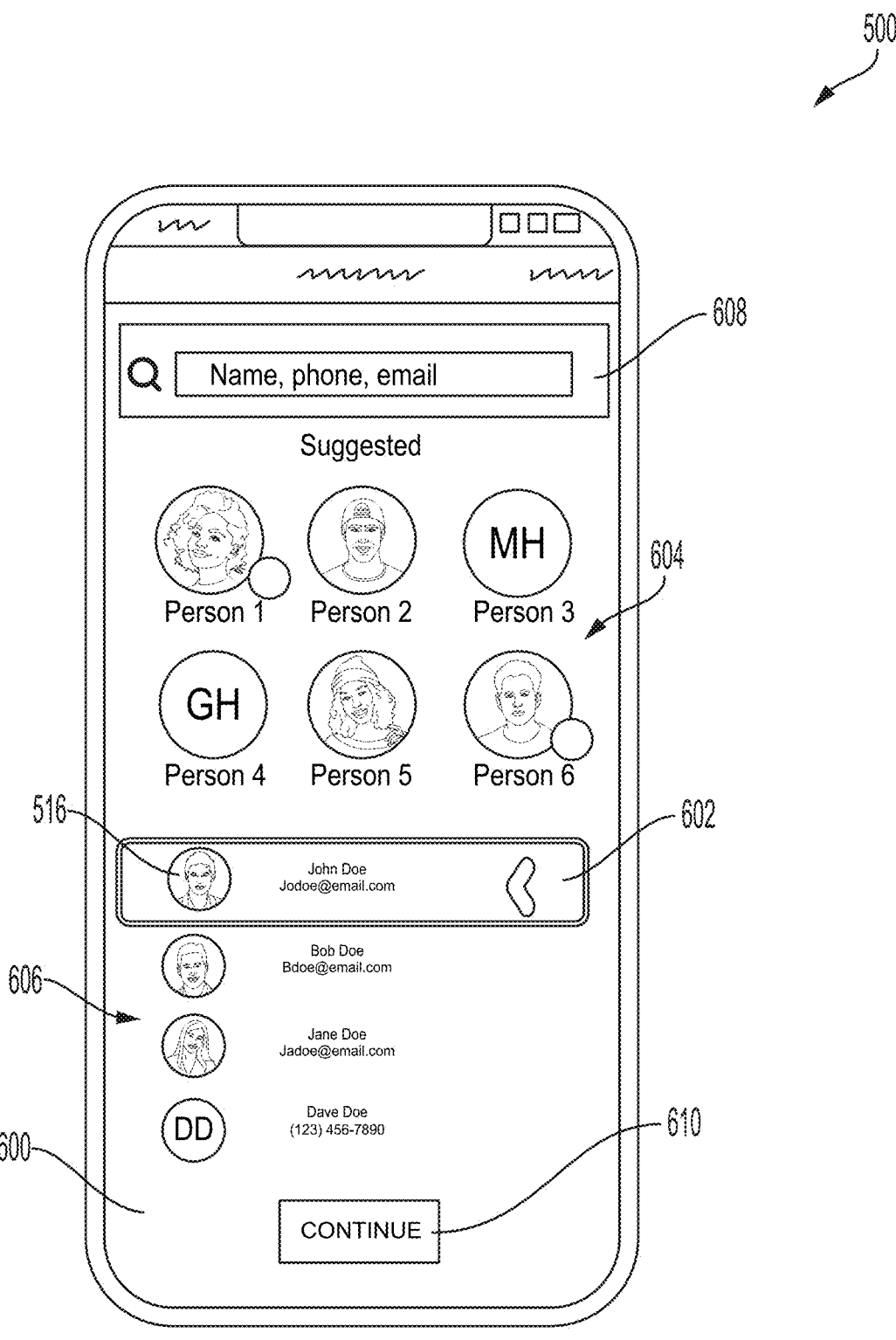
FIG. 6 is a schematic representation of a customizable second user interface of the sender computing device of FIG. 5 via which a sender can select one or more recipients to which a resource is to be transferred, according to one example.

FIG. 6 illustrates one example of a second resource transfer user interface ("second user interface") 600 that may be rendered by the application on the sender computing device 500. As shown, selection of the recipient "John Doe" as the specified recipient 516 for receiving the resource may be confirmed by the sender on the second user interface 600, such as by way of, for example, a selectable specified recipient indicator 602. The specified recipient indicator 602 may, for example, be presented as a popup, an overlay, or another display element in a display area/window of the second user interface 600. As indicated, additional identifying information associated with the specified recipient 516 may be presented by the specified recipient indicator 602 on the second user interface 600. For example, an email address and/or telephone number may be presented along with the name of the specified recipient 516 to facilitate verification of the specified recipient's identity and to avoid selection and resource transfer to an unintended recipient.

In some examples, the application may further present on the second user interface 600 one or more selectable additional recipients 604 to whom the sender may also be interested in transferring the resource. The selectable additional recipients 604 presented on the second user interface may be selected, for example, based on past resource transfer activities of the sender, a relationship between the sender and the selectable recipients, or a relationship between the selectable recipients. As previously described, in some examples, a trained machine-learning model may determine a group of selectable additional recipients to present to the sender. In any case, the sender can select one or more of the selectable additional recipients 604 to receive the resource transfer specified on the first user interface 502. When the sender selects one or more additional recipients to receive a transfer of the resource, the additional recipients may, in some examples, be displayed along with the specified recipient 516 in a listing of recipients 606 on the second user interface 600. As with the specified recipient 516 presented in the specified recipient indicator 602, each additionally selected recipient appearing in the listing of recipients 606 may have associated therewith a recipient name and further identifying information such as but not limited to an email address and/or a telephone number. In some examples, the specified recipient 516 may be highlighted or otherwise emphasized within the listing of recipients 606.

In some examples (as shown), the second user interface 600 may also display a search feature, such as a search box 608, by which the sender can search for other recipients to whom to transfer the resource. The search box 608 may also allow the sender to search for the actual intended specified recipient 516 when the additional recipient identifying information presented in specified recipient indicator 602 indicates that the specified recipient 516 identified by the application is not the correct recipient (e.g., is the wrong "John Doe"). As shown, the search box 608 may allow the sender to search for a recipient using an email address, a phone number, or via identifying information other than or in addition to the recipient's name. A widget or another interface object such as a "continue" button 610 may also be presented on the second user interface 600 to allow the sender to advance the resource transfer process once the sender has specified on the second user interface 600 all the recipients to which the sender desires to transfer the resource.

Figure 7:
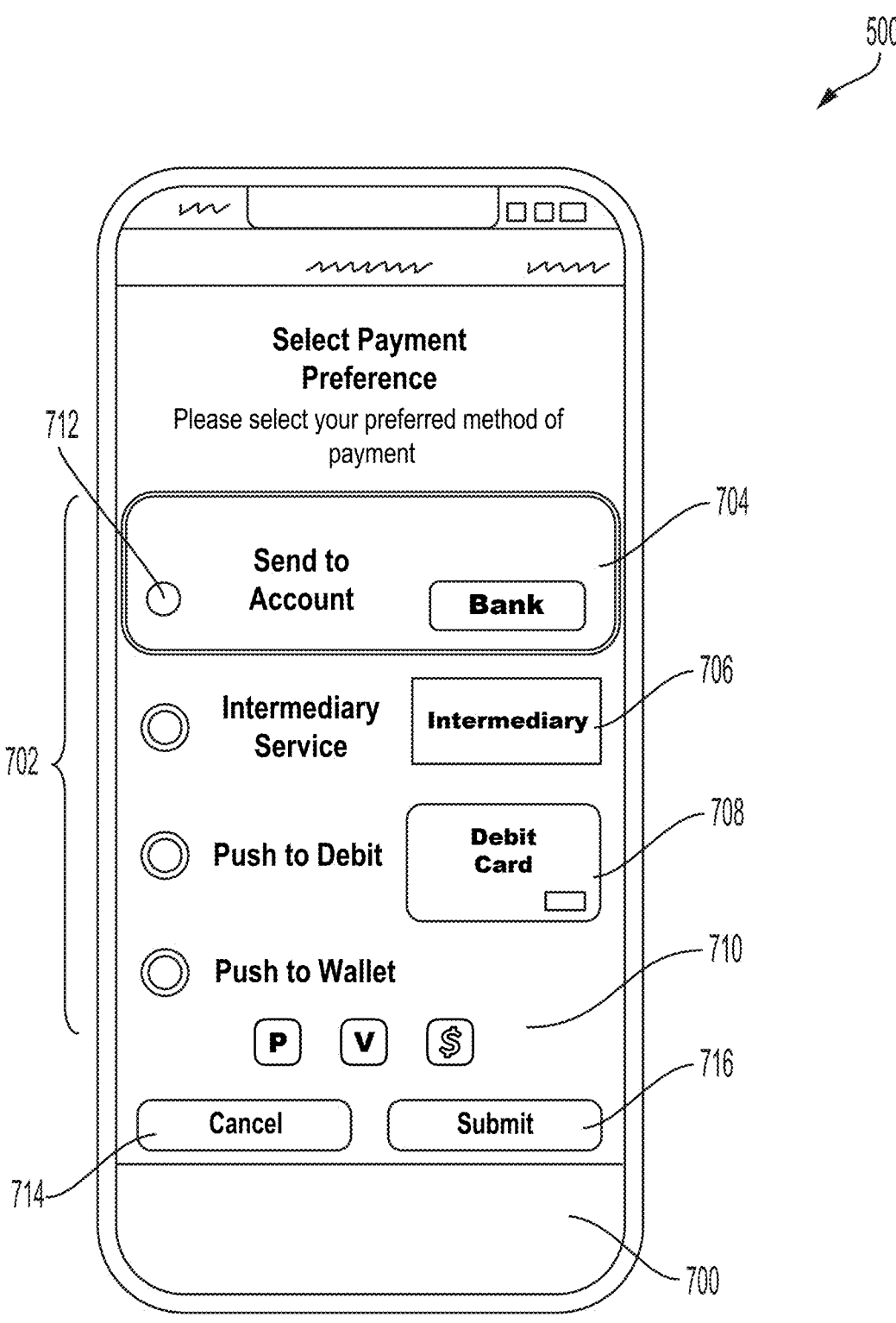
FIG. 7 is a schematic representation of a customizable third user interface of the sender computing device of FIG. 5 via which a sender can designate a preferred mode of transfer for transferring the resource to one or more selected recipients, according to one example.

FIG. 7 illustrates one example of a third resource transfer user interface ("third user interface") 700 that may be rendered by the application on the sender computing device 500. The third user interface 700 may be rendered after receiving a selection of recipients on the second user interface 600.

The third user interface 700 may, for example, present a plurality of modes of transfer 702 of the resource and can enable a designation by the sender of one of the plurality of modes of transfer 702 as a preferred mode of transfer of the resource for all the selected recipients indicated in the listing of recipients 606 on the second user interface 600 in FIG. 6. As described in more detail below, the plurality of modes of transfer 702 presented on the third user interface 700 may be based on rules and may also be determined by the first trained machine learning model 200.

As shown in FIG. 7, the plurality of modes of transfer 702 can be represented on the third user interface 700 by a plurality of selectable interface objects 704-710. In this example, the modes of transfer include a bank (ACH) transfer 704 to a user account, a transfer via an intermediary service such as a Zelle© payment 706, the issuance of a debit card 708, or a deposit to a digital wallet 710, such as via PayPal© or Venmo©. Other numbers or types of digital or physical modes of transfer may be presented on the third user interface 700 in other examples.

One or more of the interface objects 704-710 may be selected by any of various techniques. For example, as shown in FIG. 7, a selection button 712 may be associated with each of the interface objects 704-710 and can be selected via the sender computing device 500 to indicate that the mode of transfer represented by the associated interface object is a mode of transfer preferred by the sender. In this example, the sender has selected to make the resource transfer via the Zelle payment option 706. In other examples, one of the modes of transfer may be selected by selecting one of the interface objects 704-710 itself. Selection of a selection button 712 associated with an interface object 704-710 or selection of an interface object itself may be accomplished, for example, using a keyboard, a mouse, or another input device that is a part of or is communicatively coupled to the sender computing device 500. When the sender computing device 500 includes a touchscreen, as shown, selection of one or more interface objects 704-710 may also be accomplished by touching a selection button 712 or an interface object 704-710 with a finger of the sender. In some examples, interface object 704-710 selection may be accomplished by dragging one or more of the interface objects 704-710 to a designated location on the third user interface 700. In some examples, the third user interface 70 may also display a widget such as a selectable interface object that can allow a sender to respectively cancel a designation of a preferred mode of resource transfer or submit a designation of a preferred mode of resource transfer. In the former case, selecting for example, a "cancel" button 714 can facilitate cancellation of a currently selected mode of resource transfer and can allow a sender to select a different one of the presented plurality of modes of transfer. In the latter case, selecting for example, a "submit" button 716 can facilitate confirmation of a selected mode of transfer and advancement of the resource transfer process.

In some examples, a system for facilitating transfer of resources to recipients may be a virtual reality or augmented reality system, and viewing of and interaction with at least the third user interface 700 and additional user interfaces may occur in a virtual reality or augmented reality environment. In such a case, selecting one or more of the interface objects 704-710 may also be accomplished by hand gestures such as finger pinching, finger dragging, etc.

Figure 8:
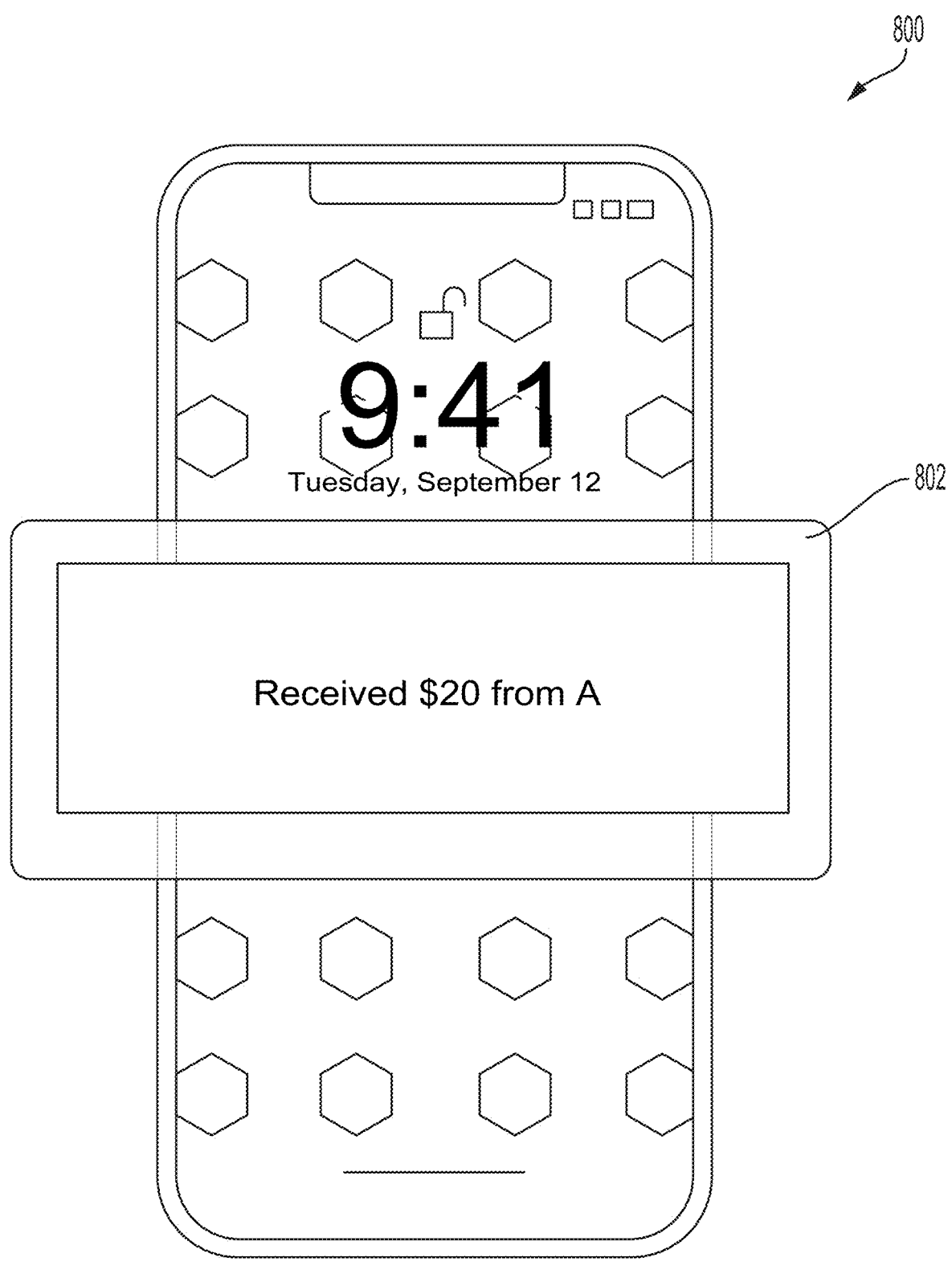
FIG. 8 is a schematic representation of a resource transfer notification on a computing device of a recipient, according to one example.

FIG. 8 illustrates one example of a recipient computing device 800. When a resource is transferred by the resource transfer computing system 110, the resource transfer computing system 110 may send a notification 802 of the transfer to the recipient computing device 800. In some examples, the notification 802 may be a device-specific push notification, such as a push notification to a smart phone (e.g., as APNS for an iOS operating system or FCM for an Android operating system). As shown in FIG. 8, in some examples, in-app notifications 802 may be sent and may appear as popups on the recipient computing device 800. In some examples, notifications 802 may be displayed on the recipient computing device 800 as overlays.

FIG. 9 is a flowchart 900 of one example of a computer-implemented method for facilitating transfer of a resource to a sender-selected recipient according to a sender-selected mode of resource transfer.

As indicated in block 902 of the flowchart 900, an application installed on a sender computing device can render a first user interface that enables specification of a resource to be transferred, as well as a recipient of the resource. A type of a resource associated with a system and method according to examples of the disclosure can vary. For example, the resource may be a computing resource, including a processing resource (e.g., physical or virtual servers, applications) or a memory resource (e.g., disk storage) such as may be associated with a cloud computing environment. In another example, a resource may be a monetary resource such as a negotiable instrument, a dividend, a payment, or another type of transaction resource. In some examples, the sender may be a business and the recipient may be another business. In other examples, the sender may be a business and the recipient may be an individual.

In block 904 of the flowchart 900, after receiving the specification of a resource to be transferred and a recipient of the resource at the first user interface, the application can render a second user interface on the sender computing device. The second user interface can enable verification of the specified recipient as the recipient of the resource. In some examples, the application may also present on the second user interface, a group of selectable additional recipients of the resource. The second user interface can also enable a selection of one or more of the selectable additional recipients as one or more additional recipients of the resource. In some examples, the group of selectable additional recipients may be determined by a trained machine-learning model. In some examples, the selectable additional recipients of the group of selectable additional recipients may be stored in a local directory of selectable recipients.

At block 906 of the flowchart 900, after receiving a verification of the specified recipient as the recipient of the resource at the second user interface, the application can render a third user interface on the sender computing device. The third user interface presents a plurality of modes of transfer of the resource and enables a designation of one of the plurality of possible modes of transfer as a preferred mode of transfer of the resource. For example, the plurality of modes of transfer of the resource may be digital modes of transfer, physical modes of transfer, or a combination of both. In one example, the plurality of modes of transfer presented to the sender may include a bank (ACH) transfer to a recipient account, a transfer via an intermediary service such as a Zelle payment, the issuance of a debit card (e.g., a virtual debit card), or a deposit to a digital wallet. In some examples, the plurality of modes of transfer may be determined by a trained machine-learning model.

As indicated in block 908 of the flowchart 900, after receiving the designation of the preferred mode of transfer of the resource at the third user interface, the application can send a resource transfer command message to a resource transfer computing system. The resource transfer command message may be generated by the application. The resource transfer command message may include information identifying at least the resource, the recipient of the resource, and the preferred mode of transfer of the resource. In some examples, an identification of the one or more additional recipients of the resource may be included in the resource transfer command message.

Receipt of the resource transfer command message by the resource transfer computing system can configure the resource transfer computing system to transfer the resource to the recipient according to the information in the resource transfer command message. When one or more additional recipients of the resource are selected by the sender and included in the resource transfer command message, the resource transfer computing system can be configured to transfer the resource to the one or more additional recipients of the resource when transferring the resource to the recipient.

In one example, the resource transfer computing system 110 may be a payment system of a financial institution. In some examples, the payment system may be deployed in a cloud-computing environment where one or more payment applications execute on one or more physical or virtual servers of a cloud services provider. Communications between a sender computing device and the payment system may be web-based communications that occur over the Internet and are initiated by the sender computing device using a web browser. A payment initiation application of the payment system may manage both a sender account authentication portion and a payment transfer portion of the payment process. For example, when the payment system receives a request for payment from a sender computing device, the payment initiation application can authenticate the sender account associated with the sender computing device and an application installed on the sender computing device can then then facilitate sender selection of a payment to a sender-selected payee via a sender-selected payment method. The application may then generate and send a payment instruction message to the payment system. In response, the system can transfer the payment to the payee via the sender-selected mode of payment.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a sender computing device communicatively couplable to a resource transfer computing system, the sender computing device including a processor and a memory communicatively coupled to the processor, the memory including instructions that are executable by the processor to cause the sender computing device to perform operations comprising:
   rendering, by an application installed on the sender computing device, a first user interface enabling specification of a resource to be transferred and a recipient of the resource, where the recipient is selectable from a searchable local directory of selectable recipients that is resident on the sender computing device and associated with the application, and where the searchable local directory of recipients is communicatively couplable to and updatable by a global directory of selectable recipients associated with the resource transfer computing system;
   subsequent to receiving the specification of the resource to be transferred and the recipient of the resource at the first user interface, rendering, by the application, a second user interface on the sender computing device, the second user interface enabling verification of the specified recipient as the recipient of the resource using recipient identifying information obtainable from the searchable local directory of selectable recipients or the global directory of selectable recipients;
   subsequent to receiving a verification of the specified recipient as the recipient of the resource at the second user interface, rendering, by the application, a third user interface on the sender computing device, the third user interface presenting a plurality of modes of transfer of the resource and enabling a designation of one of the plurality of modes of transfer as a preferred mode of transfer of the resource, where the plurality of modes of transfer are receivable from the resource transfer computing system and based on rules stored at the resource transfer computing system;
   subsequent to receiving the designation of the preferred mode of transfer of the resource at the third user interface, generating a resource transfer command message, the resource transfer command message including information identifying at least the resource, the recipient of the resource, and the preferred mode of transfer of the resource; and
   wherein the resource transfer command message is operative to configure the resource transfer computing system to transfer the resource to the recipient according to the information in the resource transfer command message.

2. The system of claim 1, wherein the resource transfer command message includes a name of the recipient and one or both of an email address and a phone number of the recipient.

3. The system of claim 1, wherein the operations further comprise:
   presenting on the second user interface, a group of selectable additional recipients of the resource;
   receiving a designation of one or more of the selectable additional recipients as one or more additional recipients of the resource;
   including an identification of the one or more additional recipients of the resource in the resource transfer command message; and
   wherein the resource transfer command message is operative to configure the resource transfer computing system to also transfer the resource to the one or more additional recipients of the resource when transferring the resource to the recipient.

4. The system of claim 3, wherein the selectable additional recipients are selectable from the searchable local directory of selectable recipients.

5. The system of claim 1, wherein the global directory of selectable recipients is updatable by the local directory of selectable recipients.

6. The system of claim 3, wherein the operations further comprise selecting the group of selectable additional recipients of the resource for presentation on the second user interface by:

providing an input to a trained machine-learning model, wherein the input comprises an identification of a classification of recipients available to receive the resource and one or both of a resource type and a resource value, and wherein the trained machine-learning model is trained on training data comprising historical sender designation data associated with a plurality of resource historical recipient designations, and one or both of resource type data and value data that relates a value to each of the resources associated with the sender historical designation data;

generating as an output, by the trained machine-learning model, a determination of a group of selectable additional recipients most likely to be of interest to the sender; and selecting some or all of the group of selectable additional recipients output by the trained machine-learning model for presentation on the sender computing device as the group of selectable additional recipients.

7. The system of claim 1, wherein the operations further comprise selecting the plurality of modes of transfer to be presented on the third user interface by:

providing an input to a trained machine-learning model, wherein the input comprises an identification of the modes of transfer that are available to the resource transfer computing system and one or both of a resource type and a resource value, and wherein the trained machine-learning model is trained on training data comprising historical designation data associated with a plurality of resource historical mode of transfer designations, and one or both of resource type data and value data that relates a value to each of the resources represented in the historical designation data;

generating as an output, by the trained machine-learning model, a determination of a plurality of the available modes of transfer most likely to be selected; and selecting some or all of the plurality of the available modes of transfer output by the trained machine-learning model for presentation on the sender computing device as the plurality of modes of transfer.

8. A computer-implemented method comprising:

rendering by an application installed on a sender computing device communicatively coupled to a resource transfer computing system, a first user interface enabling specification of a resource to be transferred and a recipient of the resource, where the recipient is selectable from a searchable local directory of selectable recipients that is resident on the sender computing device and associated with the application, and where the searchable local directory of recipients is communicatively coupled to and updatable by a global directory of selectable recipients that is resident on the resource transfer computing system;

subsequent to receiving the specification of the resource to be transferred and the recipient of the resource at the first user interface, rendering, by the application, a second user interface on the sender computing device, the second user interface enabling verification of the specified recipient as the recipient of the resource using recipient identifying information obtained from the searchable local directory of selectable recipients or the global directory of selectable recipients;

subsequent to receiving a verification of the specified recipient as the recipient of the resource at the second user interface, rendering, by the application, a third user interface on the sender computing device, the third user interface presenting a plurality of modes of transfer of the resource and enabling a designation of one of the plurality of modes of transfer as a preferred mode of transfer of the resource, where the plurality of modes of transfer are determined by the resource transfer computing system based on rules stored at the resource transfer computing system and are provided to the application on the sender computing device;

subsequent to receiving the designation of the preferred mode of transfer of the resource at the third user interface, transmitting a resource transfer command message to a resource transfer computing system, the resource transfer command message including information identifying at least the resource, the recipient of the resource, and the preferred mode of transfer of the resource; and wherein, receiving the resource transfer command message configures the resource transfer computing system to transfer the resource to the recipient according to the information in the resource transfer command message.

9. The computer-implemented method of claim 8, wherein the resource transfer command message includes a name of the recipient and one or both of an email address and a phone number of the recipient.

10. The computer-implemented method of claim 8, further comprising:

presenting on the second user interface, a group of selectable additional recipients of the resource;

receiving a designation of one or more of the selectable additional recipients as one or more additional recipients of the resource;

including an identification of the one or more additional recipients of the resource in the resource transfer command message; and configuring the resource transfer computing system to also transfer the resource to the one or more additional recipients of the resource when transferring the resource to the recipient.

11. The computer-implemented method of claim 10, wherein the selectable additional recipients are selected from the searchable local directory of selectable recipients.

12. The computer-implemented method of claim 8, wherein the global directory of selectable recipients is updatable by the local directory of selectable recipients.

13. The computer-implemented method of claim 10, further comprising selecting the group of selectable additional recipients of the resource for presentation on the second user interface by:

providing an input to a trained machine-learning model, wherein the input comprises an identification of a classification of recipients available to receive the resource and one or both of a resource type and a resource value, and wherein the trained machine-learning model is trained on training data comprising historical sender designation data associated with a plurality of resource historical recipient designations, and one or both of resource type data and value data that relates a value to each of the resources associated with the sender historical designation data;

generating as an output, by the trained machine-learning model, a determination of a group of selectable additional recipients most likely to be of interest to the sender; and selecting some or all of the group of selectable additional recipients output by the trained machine-learning model for presentation on the sender computing device as the group of selectable additional recipients.

14. The computer-implemented method of claim 8, further comprising selecting the plurality of modes of transfer to be presented on the third user interface by:

providing an input to a trained machine-learning model, wherein the input comprises an identification of the modes of transfer that are available to the resource transfer computing system and one or both of a resource type and a resource value, and wherein the trained machine-learning model is trained on training data comprising historical designation data associated with a plurality of resource historical mode of transfer designations, and one or both of resource type data and value data that relates a value to each of the resources represented in the historical designation data;

generating as an output, by the trained machine-learning model, a determination of a plurality of the available modes of transfer most likely to be selected; and selecting some or all of the plurality of the available modes of transfer output by the trained machine-learning model for presentation on the sender computing device as the plurality of modes of transfer.

15. A non-transitory computer-readable medium comprising instructions that are executable by a processor of a sender computing device for causing the sender computing device to perform operations comprising:

rendering, by an application installed on the sender computing device, a first user interface enabling specification of a resource to be transferred by a resource transfer computing system communicatively couplable to the sender computing device and a recipient of the resource, where the recipient is selectable from a searchable local directory of selectable recipients that is resident on the sender computing device and associated with the application, and where the searchable local directory of recipients is communicatively couplable to and updatable by a global directory of selectable recipients that is associated with the resource transfer computing system;

subsequent to receiving the specification of the resource to be transferred and the recipient of the resource at the first user interface, rendering, by the application, a second user interface on the sender computing device, the second user interface enabling verification of the specified recipient as the recipient of the resource using recipient identifying information obtainable from the searchable local directory of selectable recipients or the global directory of selectable recipients;

subsequent to receiving a verification of the specified recipient as the recipient of the resource at the second user interface, rendering, by the application, a third user interface on the sender computing device, the third user interface presenting a plurality of modes of transfer of the resource and enabling a designation of one of the plurality of modes of transfer as a preferred mode of transfer of the resource, where the plurality of modes of transfer are receivable from the resource transfer computing system and based on rules stored at the resource transfer computing system;

subsequent to receiving the designation of the preferred mode of transfer of the resource at the third user interface, generating a resource transfer command message, the resource transfer command message including information identifying at least the resource, the recipient of the resource, and the preferred mode of transfer of the resource; and wherein the resource transfer command message is operative to configure the resource transfer computing system to transfer the resource to the recipient according to the information in the resource transfer command message.

16. The non-transitory computer-readable medium of claim 15, wherein the resource transfer command message includes a name of the recipient and one or both of an email address and a phone number of the recipient.

17. The non-transitory computer-readable medium of claim 15, wherein the operations further comprise:

presenting on the second user interface, a group of selectable additional recipients of the resource;

receiving a designation of one or more of the selectable additional recipients as one or more additional recipients of the resource;

including an identification of the one or more additional recipients of the resource in the resource transfer command message; and wherein the resource transfer command message is operative to configure the resource transfer computing system to also transfer the resource to the one or more additional recipients of the resource when transferring the resource to the recipient.

18. The non-transitory computer-readable medium of claim 17, wherein:

the selectable additional recipients are selectable from the searchable local directory of selectable recipients; and the global directory of selectable recipients is updatable by the local directory of selectable recipients.

19. The non-transitory computer-readable medium of claim 17, wherein the operations further comprise selecting the group of selectable additional recipients of the resource for presentation on the second user interface by:

providing an input to a trained machine-learning model, wherein the input comprises an identification of a classification of recipients available to receive the resource and one or both of a resource type and a resource value, and wherein the trained machine-learning model is trained on training data comprising historical sender designation data associated with a plurality of resource historical recipient designations, and one or both of resource type data and value data that relates a value to each of the resources associated with the sender historical designation data;

generating as an output, by the trained machine-learning model, a determination of a group of selectable additional recipients most likely to be of interest to the sender; and selecting some or all of the group of selectable additional recipients output by the trained machine-learning model for presentation on the sender computing device as the group of selectable additional recipients.

20. The non-transitory computer-readable medium of claim 15, wherein the operations further comprise selecting the plurality of modes of transfer to be presented on the third user interface by:

providing an input to a trained machine-learning model, wherein the input comprises an identification of the modes of transfer that are available to the resource transfer computing system and one or both of a resource type and a resource value, and wherein the trained machine-learning model is trained on training data comprising historical designation data associated with a plurality of resource historical mode of transfer designations, and one or both of resource type data and value data that relates a value to each of the resources represented in the historical designation data;

generating as an output, by the trained machine-learning model, a determination of a plurality of the available modes of transfer most likely to be selected; and selecting some or all of the plurality of the available modes of transfer output by the trained machine-learning model for presentation on the sender computing device as the plurality of modes of transfer.

* * * * *